United States Patent [19]

Peddie et al.

[11] 4,351,028

[45] Sep. 21, 1982

[54] METERS FOR MEASURING ELECTRICAL ENERGY CONSUMPTION

[75] Inventors: Robert A. Peddie, Reigate; John S. Fielden, Ottery St. Mary, both of England

[73] Assignee: South Eastern Electricity Board, England

[21] Appl. No.: 122,166

[22] Filed: Feb. 19, 1980

[30] Foreign Application Priority Data

Feb. 21, 1979 [GB] United Kingdom ............... 7906212

[51] Int. Cl.³ ................. G01R 11/63; G06F 15/20
[52] U.S. Cl. ................. 364/483; 364/464; 324/116
[58] Field of Search .............. 364/483, 492, 464, 569; 235/92 EL; 324/115, 116

[56] References Cited

U.S. PATENT DOCUMENTS

| 3,114,900 | 12/1963 | Anderson | 340/182 |
|---|---|---|---|
| 3,783,988 | 1/1974 | Kinemura | 194/11 |
| 4,065,663 | 12/1977 | Edeards | 364/464 |
| 4,067,486 | 1/1978 | Hyde et al. | 364/465 X |
| 4,080,568 | 3/1978 | Funk | 363/464 X |
| 4,106,095 | 8/1978 | Yarbrough | 364/483 X |
| 4,110,606 | 8/1978 | Prince et al. | 364/464 X |
| 4,120,031 | 10/1978 | Kincheloe et al. | 364/483 X |
| 4,124,835 | 11/1978 | Cahill | 337/1 |
| 4,130,874 | 12/1978 | Pai | 364/514 |
| 4,162,530 | 7/1979 | Kusui et al. | 364/483 X |
| 4,199,717 | 4/1980 | Germer et al. | 364/483 X |
| 4,216,527 | 8/1980 | Emerson et al. | 364/464 X |
| 4,229,795 | 10/1980 | Vieweg et al. | 364/464 X |

FOREIGN PATENT DOCUMENTS

| 1112391 | 5/1968 | United Kingdom . |
|---|---|---|
| 1204111 | 9/1970 | United Kingdom . |
| 1260055 | 1/1972 | United Kingdom . |
| 1373581 | 11/1974 | United Kingdom . |
| 1500509 | 2/1978 | United Kingdom . |
| 1549468 | 8/1979 | United Kingdom . |

Primary Examiner—Edward J. Wise
Attorney, Agent, or Firm—Beveridge, DeGrandi & Kline

[57] ABSTRACT

An electrical energy consumption meter for use on a consumer's premises has data processing means responsive to the sensed voltage and current and to data such as tariff rates and clock information, for computing and displaying charges in monetary terms. A data link with the utility enables the utility to make use of this information and to add hire purchase commitments, etc. to the charges for energy consumption and also to enter credits for payments received. The data link may include provision for credit transfer by the consumer. Coin or token prepayment facilities may also be provided.

15 Claims, 2 Drawing Figures

METERS FOR MEASURING ELECTRICAL ENERGY CONSUMPTION

BACKGROUND OF THE INVENTION

This invention relates to meters for measuring electrical energy consumption, such as are used for example by consumers connected to an electrical power supply network.

It is the common practice at the present time to employ electromechanical kilowatt-hour meters which integrate the product of the magnitudes of the voltage and current and record, usually by means of pointers on dials, the energy consumption in kilowatt-hours. For consumers who are given credit, the meters have to be read periodically to initiate a billing operation for charging the consumer. In other circumstances, prepayment is required by means of a coin-operated mechanism or possibly a mechanism operated by tokens which have to be purchased in advance.

SUMMARY OF THE INVENTION

According to the present invention, a meter for measuring electrical power consumption by a consumer's circuit comprises means for sensing the voltage applied to that circuit and the current flowing in the circuit, digital data processing means responsive to the sensed voltage and current and operative to compute therefrom, using data from a programmable store, the charges in monetary units for energy consumed, and means for indicating or operable to indicate the accumulated credit or debit information in monetary terms. The store may be remotely programmable so that, for example, a utility can change the data in the store using a data transmission link.

In the case of a consumer operating on a pre-payment arrangement, a pre-payment device is associated with the data processor, the pre-payment device being arranged to accept coins or electronic money or tokens and to provide data in accordance with accepted pre-payment to the data processing means for updating the credit information in a memory. With such a pre-payment device, the indicator would display the total unused credit available.

The data processing means may include a clock. Such a clock for example may control the tariff rate used for computing charges for kilowatt-hours so permitting the use of a single meter with time varying tariffs. Preferably the data processor is arranged to control switching means, conveniently solid state switches, in a load circuit or in one or more of a plurality of load sub-circuits. With such switching means, the data processing means can be arranged to give a warning to the consumer, e.g. by a momentary interruption of the supply to the load, shortly before the outstanding credit is used up; such an interruption will cause the lights to flicker thereby warning the consumer that further pre-payment is required. Alternatively or additionally a display on the indicating means may be caused to flash or other warning means may be operated.

With a switching system, which can switch off one or more load circuits, it moreover is possible to program the data processing means so that, when the credit is exhausted, power may be disconnected or alternatively the permissible demand may be limited to a very low level, for example 250 watts.

The arrangement of the present invention has particular application for credit consumers if a data link is provided between the aforementioned data processing means and a remote central processor e.g. in the utility so that data about payments by the customer to the utility can be applied to update the record of the credit or debit balance displayed on the consumer's premises.

Such a data link may make use of telephone lines or power transmission lines, for example using a carrier system, or a radio link or optical fibres. The data link may be utilised in a number of ways. For example the central processor at the utility may be arranged to interrogate a consumer's data processing means periodically, for example once a month, to determine charges outstanding and to render an account directly to the consumer. The consumer may, at any time, obtain an indication from the display of his data processing means of his debit to the utility. Provision may be made also for remote insertion of debts due, for example, to hire purchase commitments, these being in addition to the automatic charge for energy usage.

Credit limits can be put in the program in the data processing means. When the limit is approached, warning may be given to the consumer by momentary interruption of supply, as described above, by making use of switching circuits controlled from the data processing means or by causing the display to flash. Such warnings may be followed subsequently by reduction of the permissible demand to a low level or by complete interruption of the supply. The frequency and duration of such warning at the current level settings can be set into the data processing means in accordance with the particular requirements of each consumer.

Such warnings and reduction or interruption of the current may also be used in the case of non-payment of an account within a predetermined period, the non-payment being determined in a central processor of the utility which when, via the data link, sets the necessary program information into the data processing means at the consumer.

With the use of a data link, other forms of payment may be made. A direct debit or credit card transfer or similar system of payment may be agreed between the utility and the consumer so that the consumer, when he wishes to pay all or part of a rendered account, makes use of a keyboard associated with the data processing unit to key in a security number, which may be checked by means of a visual display, and then to key in the amount to be paid. Again provision may be made for displaying this amount so that it can be checked before an entry key is operated. Conveniently such an operation would lead to storage of the keyed data in a memory in the data processing means until such time as the data can be transmitted to the central data processor at the utility. Immediately on keying the information into the data processing means, the total debit or credit in the memory can be adjusted but, if the transaction should subsequently fail, for example if a bank does not accept the financial transfer, then the data link may be utilised subsequently to reinstate the sum involved in the credit/debit register. Provision may be made for ensuring that the data processing means no longer accepts that credit transfer procedure until it has had further instructions from the utility.

DESCRIPTION OF THE PREFERRED EMBODIMENTS

Figure 1:
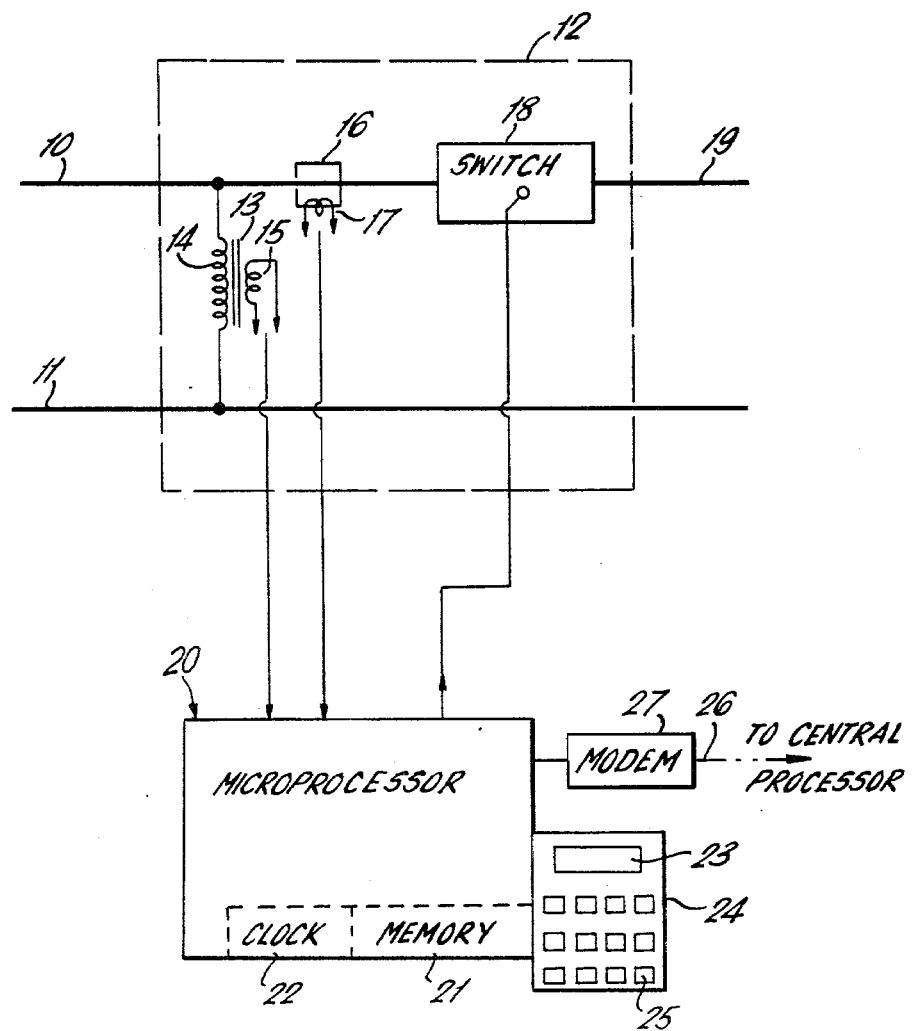
FIG. 1 is a block diagram illustrating diagrammatically energy consumption metering apparatus constituting one embodiment of the present invention for use by a credit consumer.

Referring to FIG. 1 there is shown diagrammatically incoming live and neutral leads 10, 11 providing an alternating power supply from a utility. In the customer's premises, there is a unit 12 containing a voltage transformer 13 having an input winding 14 connected between the live and input leads and an output winding 15 to provide a voltage signal output. On the live lead there is a current transformer 16 having an output winding 17 giving a current output signal. The unit 12 also includes a switching device 18, conveniently a solid state switch formed of thyristor units, which can limit the magnitude of the current on the output lead 19 by switching off. The lead 19 is connected to the consumer's load. In the consumer's premises but possibly remote from the unit 12 is a data processing unit 20 containing a microprocessor which receives voltage information from the voltage winding 15 and current information from the current winding 17 and which determines therefrom the instantaneous power consumption and integrates this power consumption. Conveniently this is done by pulse sampling the voltage and current waveforms simultaneously at a plurality of points in each cycle as is described in the specification of co-pending Application Ser. No. 110,027, filed Jan. 7, 1980 by John Spensley Fielden, entitled "Electric Kilowatt-Hour Meter for Measuring Electrical Energy Consumption."

The microprocessor unit 20 includes or has associated therewith a programmable memory 21 for storage of data including tariff information. This tariff information may be dependent on clock time and the microprocessor includes a clock 22 so that the determined energy consumption can be converted into a charge in monetary units. The memory also includes any necessary further information relating to charges, for example a time based charge to enter pro-rata amounts periodically for any fixed charge component in the consumer's tariff. The microprocessor can determine maximum demand and compute any charges based on maximum demands within predetermined accounting periods. The total accumulated debit or credit charge can be displayed on a display unit 23. In the particular embodiment illustrated, the display unit 23 is part of a unit including a key pad 24, and a key, such as one of the keys 25, has to be operated to display in indicator 23 the amount in the appropriate register in the unit 20. The keys 25 are for enabling consumers to pay the utility by a direct debit on their bank account or by making use of a credit card facility, this being done over a data link 26 leading to a central processor at the utility. This data link includes a modem or other isolator 27 and may make use of telephone lines or power transmission lines, e.g. using a carrier frequency for data transmission in both directions between the central processor and the data processing unit 20. Any other suitable form of data link may be employed, e.g. a radio link or an optical fibre link. To make a desired payment, the consumer would key in a security number, for example a number indicative of a particular credit card, this number would be displayed on the display 23 and may be checked before being transferred to a register in the unit 20. The customer would then key in the amount of the transfer and again check it on the indicator 23 before transferring to the register. The appropriate amount would be utilised immediately to update the credit/debit information in the register in the microprocessor 20 and would subsequently be transferred via the data link 26 to the central processor at the utility.

The programmable memory 21 may include information about credit limits and provision may be made for comparing the accumulated charge with the credit limit. As credit limit is approached, a warning may be given. For example the display 23 may be made to flash or the switching circuit 18 may be operated momentarily to cause the consumer's lights to flicker and the picture on his television set to roll. This may be done periodically and, in accordance with the program set in the memory 21, the switching unit 18 may be operated either to disconnect power from the consumer's load circuit 19 or possibly to limit the power available to that circuit to a predetermined low value, for example 250 watts.

Figure 2:
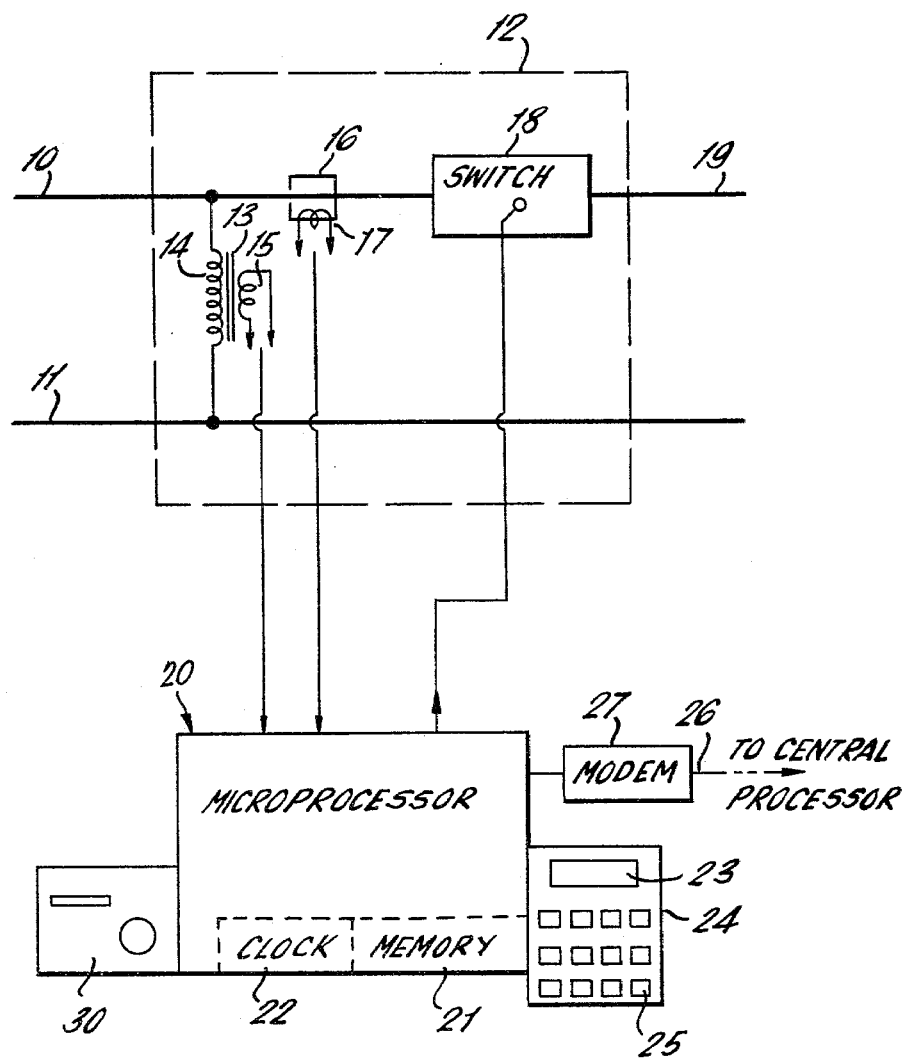
FIG. 2 illustrates a modified form of the apparatus of FIG. 1 arranged for coin pre-payment.

FIG. 2 illustrates a modification of the arrangement of FIG. 1 in which a coin pre-payment mechanism 30 is associated with the microprocessor 20. The coin pre-payment mechanism utilises the display 23 to display, in this case, the outstanding balance of credit from coins inserted in the unit 30. The data link 26 may still be provided in such a pre-payment metering system. This enables the consumer effectively to insert credit into the meter by paying cash directly to the utility, who can then increase the meter credit remotely via the data link. The data link also permits of modification of the information in the microprocessor as may be necessary. For example the tariff may be modified to cover past debts as well as to cover current consumption. The pre-payment mechanism conveniently is an add-on device which may be associated with a normal credit meter; the credit in this case is derived from the payments made by insertion of coins and possibly by prior payment to the utility as described above. When the pre-payments are exhausted, the credit meter operates in the manner described with reference to FIG. 1 for exhaustion of a credit limit. A mechanical flag signal may be provided to indicate the need for further payment to be made to obtain restoration of supply to the consumer.

We claim:

1. A meter for measuring electrical power consumption by a load circuit of a consumer comprising sensing means for sensing the voltage applied to that circuit and the current flowing in the circuit, digital data processing means responsive to the sensed voltage and current from said sensing means and including a programmable memory and operative to compute from the values of the sensed voltage and current and from data in the programmable memory, the charges in monetary units for energy consumed, means for periodically including in the computed charges a time-dependent component, and means for indicating the total accumulated credit or debit information in monetary terms.

2. A meter as claimed in claim 1 in which said data processing means includes a second memory, said meter further comprising a pre-payment device associated with the data processing means, the pre-payment device being arranged to accept coins or electronic money or tokens and to provide data in accordance with accepted pre-payment to the data processing means for updating credit information in the second memory.

3. A meter as claimed in claim 1 wherein the data processing means includes a clock controlling the means for periodically adding a time-dependent component to the computed charges.

4. A meter as claimed in claim 1 further comprising switching means in the load circuit or in one or more of a plurality of load sub-circuits energized from the load circuit and arranged to be controlled by the data processing means.

5. A meter as claimed in claim 4 wherein the data processing means includes means for momentarily interrupting the supply to the load circuit or load sub-circuit shortly before the outstanding credit is used up.

6. A meter as claimed in claim 4 wherein the data processing means includes means for operating said switching means when the credit is exhausted, either to disconnect the power or alternatively to limit the permissible demand to a low level.

7. A meter as claimed in claim 1 wherein the data processing means includes a visible display and means for causing said display to flash shortly before the outstanding credit is used up.

8. A meter as claimed in claim 1 further comprising a data link for coupling said data processing means to a remote control processor.

9. A meter as claimed in claim 8 wherein the data link is arranged for two-way data transmission.

10. A meter as claimed in claim 8 wherein the data link is adapted to transmit periodic control data to said means for periodically adding a time-dependent component to the computed charge.

11. A meter as claimed in claim 1 further comprising a data link for coupling said data processing means to a remote control processor and arranged for two-way data transmission and a display unit in said data processing means and operable to display the accumulated credit or debit information.

12. A meter as claimed in claim 11 further comprising a keyboard for transmission via said data processing means and said data link of credit transfer instructions.

13. A meter for measuring electrical power consumption by a load circuit of a consumer comprising sensing means for sensing the voltage applied to that circuit and the current flowing in the circuit; digital data processing means responsive to the sensed voltage and current from said sensing means and including a programmable memory portion and a second memory portion and operative to compute from the sensed voltage and current, using data from the programmable memory portion, the charges in monetary units for energy consumed; means for periodically including a time-dependent component in the computed charge; means operable to indicate the accumulated credit or debit information in monetary terms; a pre-payment device associated with the data processing means, the pre-payment device being arranged to accept coins or electronic money or tokens and to provide data in accordance with accepted pre-payment to the data processing means for updating credit information in the second memory portion; and switching means in said load circuit and controlled by said data processing means for limiting the permissible power consumption, when the credit is exhausted, to a low level.

14. A meter as claimed in claim 13 wherein the data processing means includes means for momentarily interrupting the supply to a load sub-circuit shortly before the outstanding credit is used up.

15. A meter as claimed in claim 13 wherein the data processing means includes a visible display means for causing said display to flash shortly before the outstanding credit is used up.

* * * * *